US012770553B2

(12) United States Patent
Kim et al.

(10) Patent No.: US 12,770,553 B2
(45) Date of Patent: Oct. 20, 2026

(54) DISPLAY DRIVING CIRCUIT, DISPLAY DEVICE INCLUDING THE DISPLAY DRIVING CIRCUIT, AND ELECTRONIC DEVICE INCLUDING THE DISPLAY DEVICE

(71) Applicant: SAMSUNG DISPLAY CO., LTD., Yongin-si (KR)

(72) Inventors: Hanbit Kim, Yongin-si (KR); Meejae Kang, Yongin-si (KR); Jiyeong Shin, Yongin-si (KR); Yunjung Oh, Yongin-si (KR); Dokyeong Lee, Yongin-si (KR); Kiseok Choi, Yongin-si (KR); Sanggun Choi, Yongin-si (KR); Taehyun Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/079,688

(22) Filed: Mar. 14, 2025

(65) Prior Publication Data

US 2026/0024484 A1 Jan. 22, 2026

(30) Foreign Application Priority Data

Jul. 18, 2024 (KR) ........................ 10-2024-0094749

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2310/08* (2013.01); *G09G 2320/0247* (2013.01)

(58) Field of Classification Search
CPC ............. G09G 3/32; G09G 2300/0819; G09G 2300/0842; G09G 2310/08; G09G 2320/0247
See application file for complete search history.

(56) References Cited

U.S. PATENT DOCUMENTS 11,322,093 B2 5/2022 Park et al.
2004/0179005 A1* 9/2004 Jo .......................... G09G 3/325 345/211
2021/0125560 A1* 4/2021 Park ...................... G09G 3/3258

FOREIGN PATENT DOCUMENTS

CN 112712773 A 4/2021
KR 10-2019-0056465 A 5/2019
(Continued)

*Primary Examiner* — Amit Chatly
(74) *Attorney, Agent, or Firm* — F. CHAU & ASSOCIATES, LLC

(57) ABSTRACT

A display driving circuit for a display device includes a pixel receiving a first power supply voltage and a second power supply voltage. The pixel comprises a driving transistor configured to generate a driving current, a data writing transistor configured to provide a data voltage to the driving transistor, and a light-emitting element configured to emit light based on the driving current. A display controller controls the first and second power supply voltages during an emission period of a frame period. The emission period includes sub-emission periods in which the pixel emits light and black insertion periods in which the pixel does not emit light, alternating with one another. The display driving circuit adjusts the power supply voltages to regulate the transitions between these periods, coordinating the operation of the pixel within the frame period.

10 Claims, 12 Drawing Sheets

(56) References Cited

FOREIGN PATENT DOCUMENTS

| | | | |
|---|---|---|---|
| KR | 10-2020-0023561 | A | 3/2020 |
| KR | 10-2021-0049220 | A | 5/2021 |
| KR | 10-2021-0060692 | A | 5/2021 |
| KR | 10-2367752 | B1 | 3/2022 |

* cited by examiner

DISPLAY DRIVING CIRCUIT, DISPLAY DEVICE INCLUDING THE DISPLAY DRIVING CIRCUIT, AND ELECTRONIC DEVICE INCLUDING THE DISPLAY DEVICE

CROSS-REFERENCE TO RELATED APPLICATION

This U.S. patent application claims priority under 35 USC § 119 to Korean Patent Application No. 10-2024-0094749 filed on Jul. 18, 2024 in the Korean Intellectual Property Office (KIPO), the entire disclosure of which is incorporated by reference in its entirety herein.

1. TECHNICAL FIELD

Embodiments of the present inventive concept are directed to a display driving circuit, a display device including the display driving circuit, and an electronic device including the display device.

2. DISCUSSION OF RELATED ART

Display devices which provide virtual reality (VR) or augmented reality (AR) create immersive experiences by enhancing the way users interact with digital content and the real world.

VR devices create a completely immersive digital environment, isolating the user from the real world. These devices, like VR headsets, use screens or displays (one for each eye) and sensors (e.g., gyroscopes, accelerometers) to track head movement and provide a stereoscopic 3D experience.

AR devices overlay digital content onto the real-world environment in real-time. AR devices, like AR glasses or smartphone screens, use transparent displays, cameras, and sensors to project virtual objects or information into the user's view of the real world.

In VR and AR devices, the display is positioned very close to the user's eyes, often within a few centimeters. This short viewing distance makes any imperfections in the display (e.g., low resolution, image artifacts) more noticeable compared to traditional displays viewed from farther away. Since the user is closely engaged with the display, any visual imperfections have a more significant effect on their experience. For example, a motion blur may occur when the display cannot keep up with rapid image updates. When users perceive motion blur, it can disrupt the illusion of immersion and cause discomfort or dizziness.

A frame period is the time it takes to display one frame of an image on the screen. The emission period is the portion of the frame period during which the pixels emit light. When a ratio of the emission period of the frame period is reduced, the motion blur may be reduced, but a luminance may also be reduced. Therefore, a method of increasing the luminance while reducing the motion blur is required.

SUMMARY

Embodiments of the present inventive concept provide a pixel for increasing a luminance while reducing a motion blur.

Embodiments of the present inventive concept provide a display device including the pixel.

Embodiments of the present inventive concept provide an electronic device including the display device.

A display driving circuit for driving a display device is provided according to the present inventive concept. The display driving circuit includes a display controller. The display device includes a pixel that receives first and second power supply voltages. The pixel includes a driving transistor configured to generate a driving current, a data writing transistor configured to provide a data voltage to the driving transistor, and a light emitting element configured to emit light based on the driving current. The display controller is for controlling the first power supply voltage and the second power supply value during an emission period of a frame period for the pixel so that the frame period includes sub-emission periods in which the pixel emits light and black insertion periods in which the pixel does not emit the light that alternate with one another.

In an embodiment, the display controller controls the first power supply voltage to have a high level and the second power supply voltage to have a low level, in the sub-emission periods.

In an embodiment, the display controller controls the first power supply voltage to have a low level and the second power supply voltage to have a high level, in the black insertion periods.

In an embodiment, a high level of the first power supply voltage may be higher than the low level of the first power supply voltage, and the high level of the second power supply voltage may be higher than a low level of the second power supply voltage.

In an embodiment, the low level of the first power supply voltage may be equal to the high level of the second power supply voltage.

In an embodiment, the driving current may be generated in the sub-emission periods and not generated in the black insertion periods.

In an embodiment, the display controller controls the first power supply voltage and the second power supply voltage such that the pixel and at least one other pixel operate with simultaneous emission driving.

In an embodiment, a ratio of the sub-emission period to the frame period may be greater than or equal to 10 percent.

In an embodiment, the pixel may comprise the driving transistor including a gate electrode connected to a first node, a first electrode receiving the first power supply voltage, and a second electrode connected to a second node, a compensation transistor including a gate electrode receiving a compensation gate signal, a first electrode connected to the second node, and a second electrode connected to a third node, the data writing transistor including a gate electrode receiving a data write gate signal, a first electrode connected to the third node, and a second electrode connected to the first node, a storage capacitor including a first electrode receiving an initialization voltage and a second electrode connected to the first node, a parasitic capacitor including a first electrode connected to a data line transmitting the data voltage and a second electrode connected to the third node, and the light emitting element including an anode connected to the second node and a cathode receiving the second power supply voltage.

In an embodiment, the driving transistor, the compensation transistor, and the data writing transistor may PMOS transistors.

In an embodiment of a display device according to the present inventive concept, the display device includes a display panel including a pixel, a gate driver configured to provide a gate signal to the pixel, a data driver configured to provide a data voltage to the pixel, and a power supply voltage generator configured to provide a first power supply voltage and a second power supply voltage. An emission period of a frame period for the pixel includes sub-emission periods in which the pixel emits a light that alternate with black insertion periods in which the pixel does not emit the light.

In an embodiment, in the sub-emission periods, the power supply voltage generator may set the first power supply voltage to a high level and the second power supply voltage to a high level.

In an embodiment, in the black insertion periods, the power supply voltage generator sets the first power supply voltage to a low level and the second power supply voltage to a high level.

In an embodiment, a high level of the first power supply voltage may be higher than the low level of the first power supply voltage, and the high level of the second power supply voltage may be higher than a low level of the second power supply voltage.

In an embodiment, the low level of the first power supply voltage may be equal to the high level of the second power supply voltage.

In an embodiment, a driving current of the pixel may be generated in the sub-emission periods and not generated in the black insertion periods.

In an embodiment, the pixel may operate with a simultaneous emission driving.

In an embodiment, a ratio of the sub-emission period to the frame period may be greater than or equal to 10 percent.

In an embodiment, the pixel may comprise a first transistor including a gate electrode connected to a first node, a first electrode receiving the first power supply voltage, and a second electrode connected to a second node, a second transistor including a gate electrode receiving a compensation gate signal, a first electrode connected to the second node, and a second electrode connected to a third node, a third transistor including a gate electrode receiving a data write gate signal, a first electrode connected to the third node, and a second electrode connected to the first node, a storage capacitor including a first electrode receiving an initialization voltage and a second electrode connected to the first node, a parasitic capacitor including a first electrode connected to a data line transmitting the data voltage and a second electrode connected to the third node, and a light emitting element including an anode connected to the second node and a cathode receiving the second power supply voltage.

In an embodiment, the first transistor, the second transistor, and the third transistor may be PMOS transistors.

In an embodiment of an electronic device according to the present inventive concept, the electronic device includes a display panel including a pixel, a gate driver configured to provide a gate signal to the pixel, a data driver configured to provide a data voltage to the pixel, a power supply voltage generator configured to provide a first power supply voltage and a second power supply voltage, and a processor configured to the gate driver, the data driver, the power supply voltage generator. An emission period of a frame period for the pixel includes sub-emission periods in which the pixel emits a light that alternate with black insertion periods in which the pixel does not emit the light.

According to one or more of these embodiments, the emission period of a pixel may include sub-emission periods that alternate with black insertion periods. A user's eyes may rest in a middle of the emission period, and a dizziness may be relatively reduced. That is, a motion blur may be reduced. Therefore, even if a luminance of the pixel is secured by increasing a time that the pixel emits the light, a motion blur should not increase.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION

Hereinafter, the present inventive concept will be described in more detail with reference to the accompanying drawings.

The inventive concept addresses the challenge of balancing motion blur reduction and luminance maintenance in display devices, particularly for VR and AR applications. It introduces a pixel structure and operational method where the emission period of a frame period is divided into sub-emission periods (when the pixel emits light) and black insertion periods (when the pixel does not emit light). This alternating pattern allows the user's eyes to rest during the black insertion periods, reducing motion blur and dizziness without sacrificing luminance by extending the total time the pixel emits light.

The pixel structure includes transistors for generating a driving current and controlling the pixel, along with a light-emitting element. By alternating between high and low levels of first and second power supply voltages, the pixel alternates between emitting and non-emitting states during the frame period. This design enables a smoother viewing experience with reduced visual discomfort, even when the luminance is increased.

Figure 1:
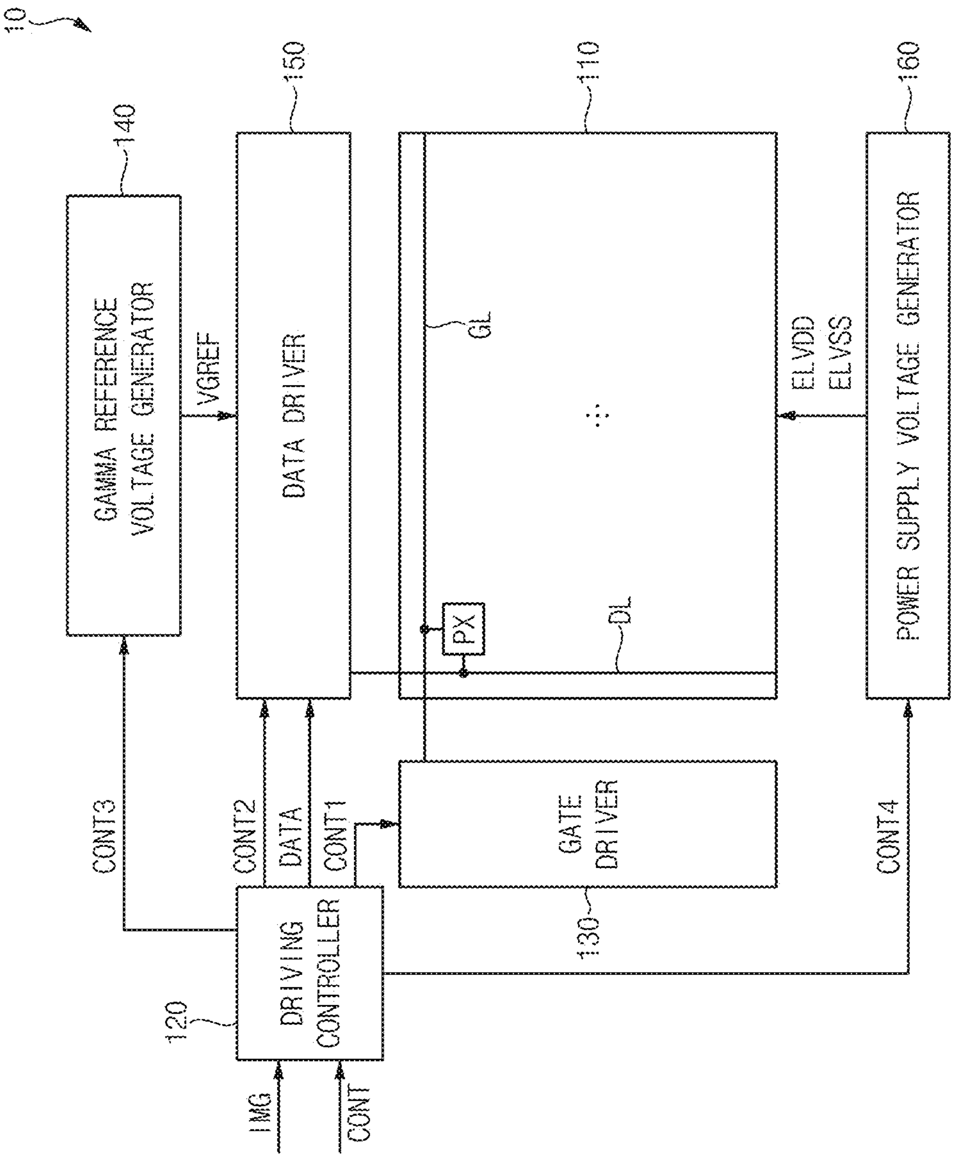
FIG. 1 is a block diagram showing a display device according to an embodiment of the present inventive concept.

FIG. 1 is a block diagram showing a display device 10 according to an embodiment of the present inventive concept.

Referring to FIG. 1, a display device 10 may include a display panel 110 and a display panel driver. The display panel driver may include a driving controller 120 (e.g., a controller circuit), a gate driver 130 (e.g., a first driver circuit), a gamma reference voltage generator 140, a data driver 150 (e.g., a second driver circuit), and a power supply voltage generator 160.

The display panel 110 may include a display area for displaying an image and a peripheral area disposed adjacent to the display area. The peripheral area may surround the display area.

The display panel 110 may include gate lines GL, data lines DL, and pixels PX electrically connected to the gate lines GL and the data lines DL, respectively. The gate lines GL may extend in a first direction, the data lines DL may extend in a second direction crossing the first direction. The first direction may be perpendicular to the second direction.

The driving controller 120 (or a timing controller) may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 120 may generate a first control signal CONT1, a second control signal CONT2, a third control signal CONT3, a fourth control signal CONT4, and a data signal DATA based on the input image data IMG and the input control signal CONT.

The driving controller 120 may generate the first control signal CONT1 for controlling an operation of the gate driver 130 based on the input control signal CONT, and output the first control signal CONT1 to the gate driver 130. The first control signal CONT1 may include a vertical start signal and a gate clock signal.

The driving controller 120 may generate the second control signal CONT2 for controlling an operation of the data driver 150 based on the input control signal CONT, and output the second control signal CONT2 to the data driver 150. The second control signal CONT2 may include a horizontal start signal and a load signal.

The driving controller 120 may generate the data signal DATA based on the input image data IMG. The driving controller 120 may output the data signal DATA to the data driver 150.

The driving controller 120 may generate the third control signal CONT3 for controlling an operation of the gamma reference voltage generator 140 based on the input control signal CONT, and output the third control signal CONT3 to the gamma reference voltage generator 140.

The driving controller 120 may generate the fourth control signal CONT4 for controlling an operation of the power supply voltage generator 160 based on the input control signal CONT, and output the fourth control signal CONT4 to the power supply voltage generator 160.

The gate driver 130 (or a scan driver) may generate gate signals for driving the gate lines GL in response to the first control signal CONT1 received from the driving controller 120. The gate driver 130 may output the gate signals to the gate lines GL.

The gamma reference voltage generator 140 may generate a gamma reference voltage VGREF in response to the third control signal CONT3 received from the driving controller 120. The gamma reference voltage generator 140 may provide the gamma reference voltage VGREF to the data driver 150. The gamma reference voltage VGREF may have a value corresponding to each data signal DATA.

For example, the gamma reference voltage generator 140 may be disposed in the driving controller 120 or may be disposed in the data driver 150.

The data driver 150 may receive the second control signal CONT2 and the data signal DATA from the driving controller 120, and receive the gamma reference voltage VGREF from the gamma reference voltage generator 140. The data driver 150 may convert the data signal DATA into a data voltage having an analog type using the gamma reference voltage VGREF. The data driver 150 may output the data voltage to the data line DL.

The power supply voltage generator 160 may generate a first power supply voltage ELVDD and a second power supply voltage ELVSS based on the fourth control signal CONT4 received from the driving controller 120. The power supply voltage generator 160 may output the first power supply voltage ELVDD and the second power supply voltage ELVSS. For example, the first power supply voltage ELVDD may differ in value from the second power supply voltage ELVSS.

Figure 2:
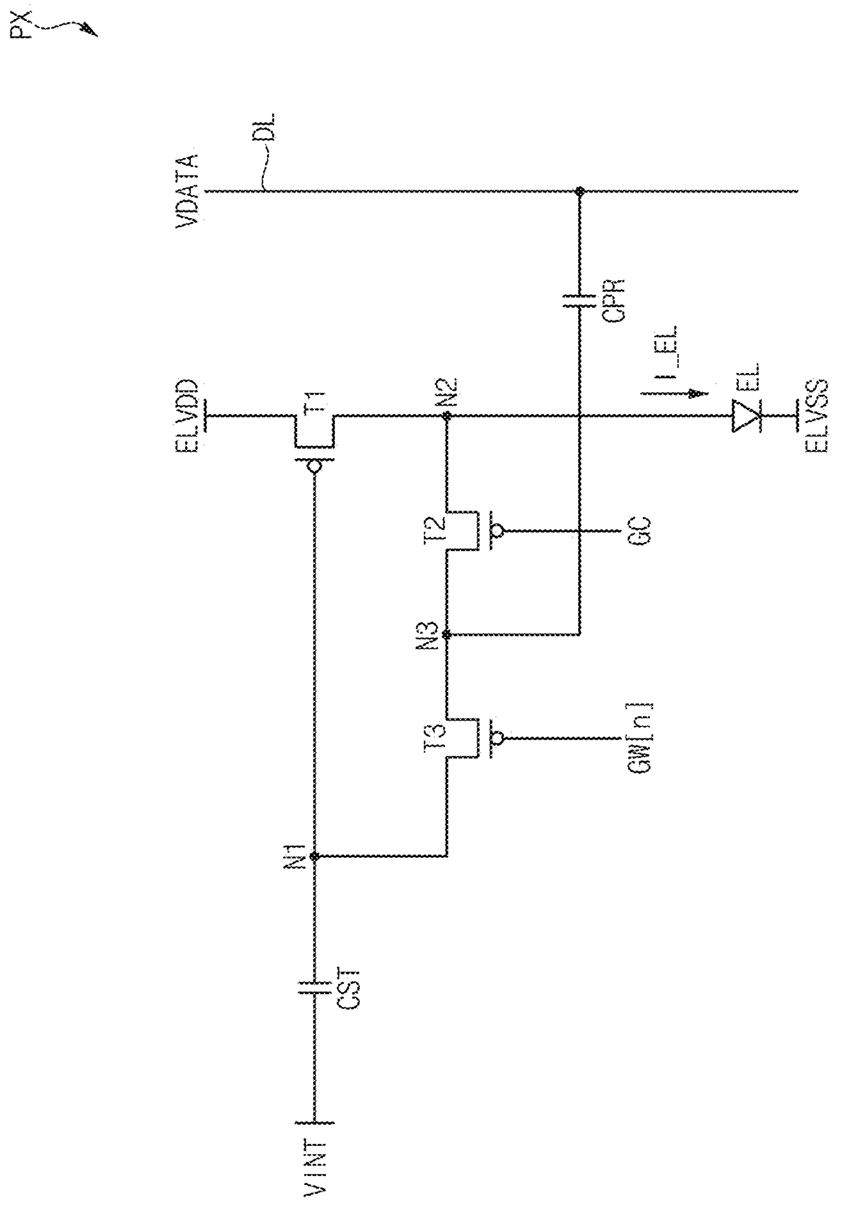
FIG. 2 is a circuit diagram showing an example of a pixel of FIG. 1.

FIG. 2 is a circuit diagram showing an example of a pixel PX of FIG. 1.

Referring to FIG. 2, a pixel PX may include a first transistor T1 (e.g., a driving transistor), a second transistor T2 (e.g., a compensation transistor), a third transistor T3 (e.g., a data writing transistor), a storage capacitor CST, a parasitic capacitor CPR, and a light emitting element EL.

The first transistor T1 may include a gate electrode connected to a first node N1, a first electrode receiving a first power supply voltage ELVDD, and a second electrode connected to a second node N2.

The second transistor T2 may include a gate electrode receiving a compensation gate signal GC, a first electrode connected to the second node N2, and a second electrode connected to a third node N3.

The third transistor T3 may include a gate electrode receiving a data write gate signal GW[n], a first electrode connected to the third node N3, and a second electrode connected to the first node N1.

The first transistor T1, the second transistor T2, and the third transistor T3 may be P-channel metal-oxide-semiconductor (PMOS) transistors.

The storage capacitor CST may include a first electrode receiving an initialization voltage VINT and a second electrode connected to the first node N1.

The parasitic capacitor CPR may include a first electrode connected to a data line DL transmitting a data voltage VDATA and a second electrode connected to the third node N3.

The light emitting element EL may include an anode connected to the second node N2 and a cathode receiving a second power supply voltage ELVSS.

Figure 3:
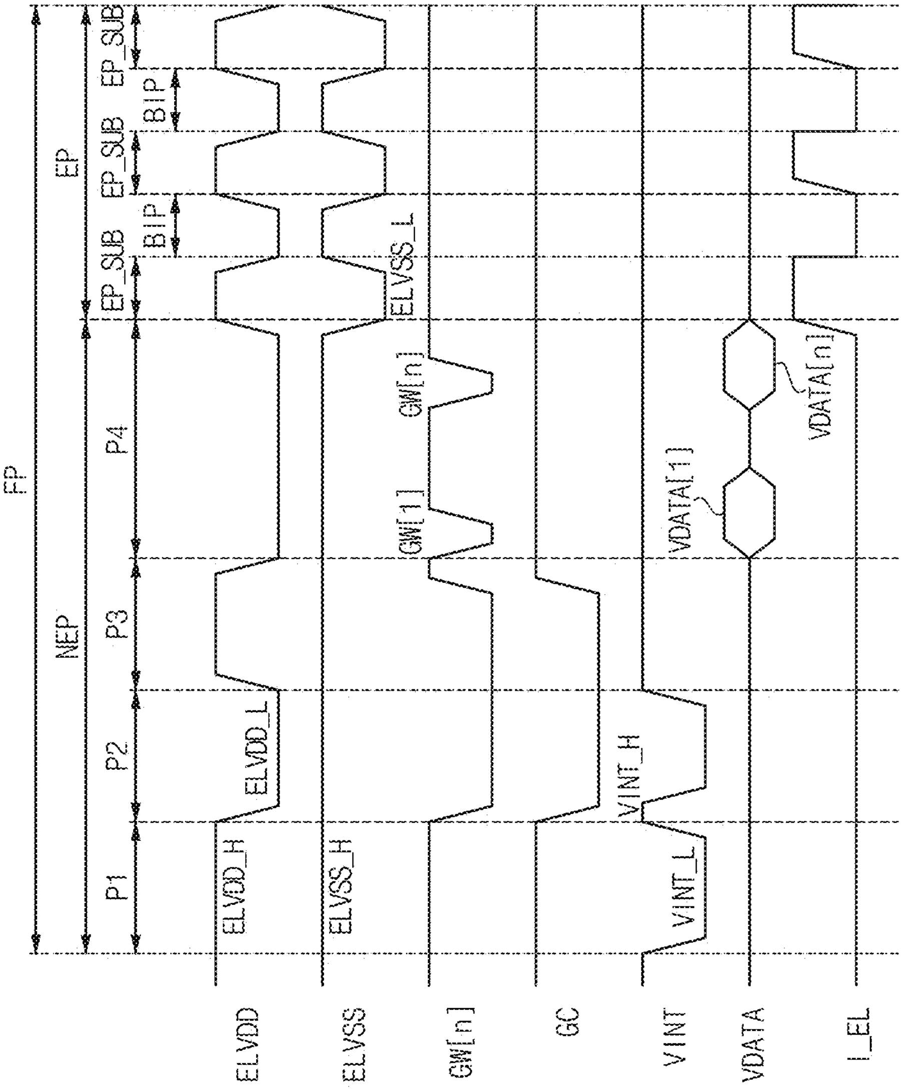
FIG. 3 is a timing diagram showing a first power supply voltage, a second power supply voltage, a data write gate signal, a compensation gate signal, an initialization voltage, a data voltage, and a driving current of FIG. 2.
Figure 4:
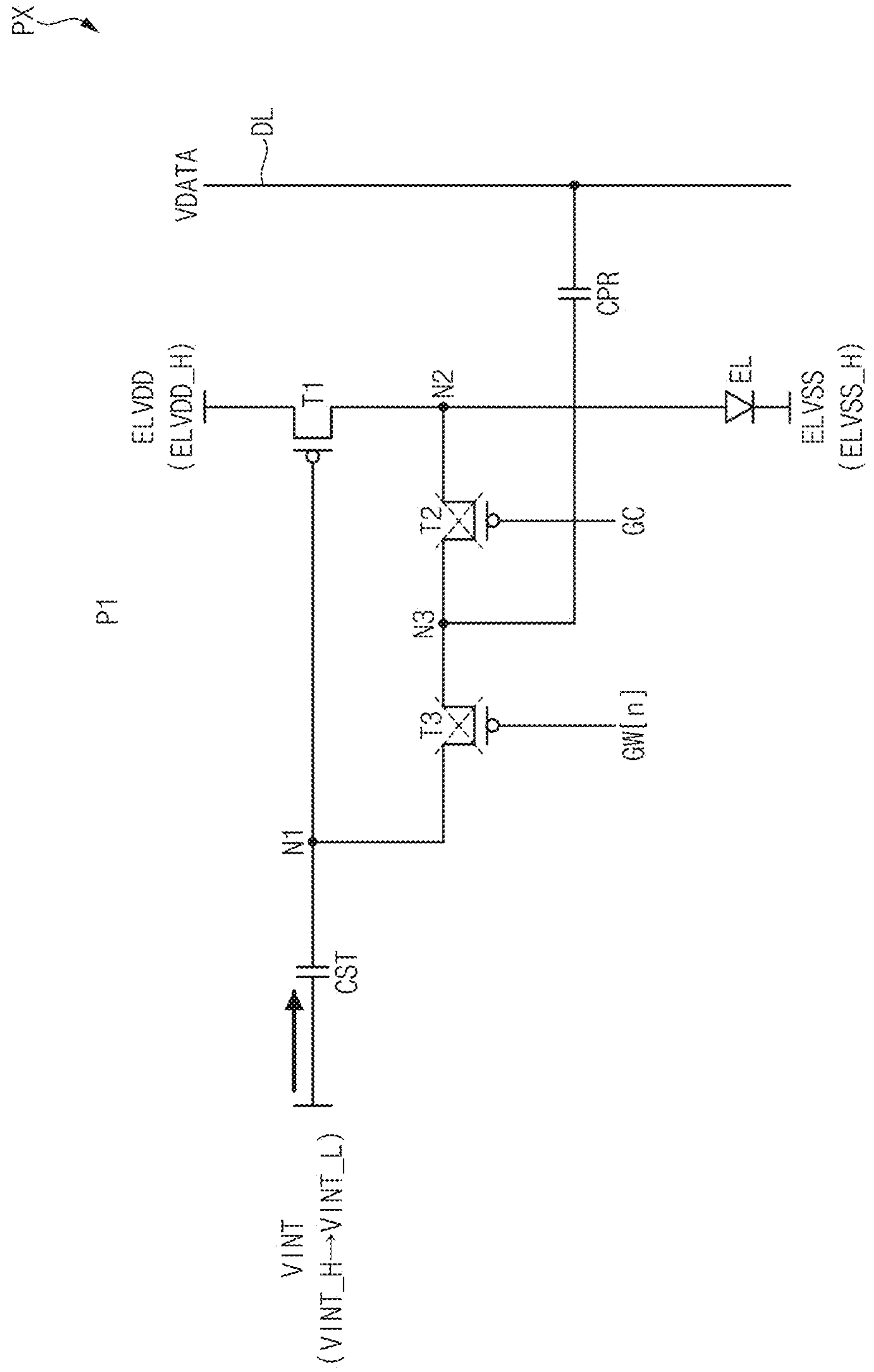
FIG. 4 is a circuit diagram showing an operation of a pixel of FIG. 2 in a first period of FIG. 3.
Figure 5:
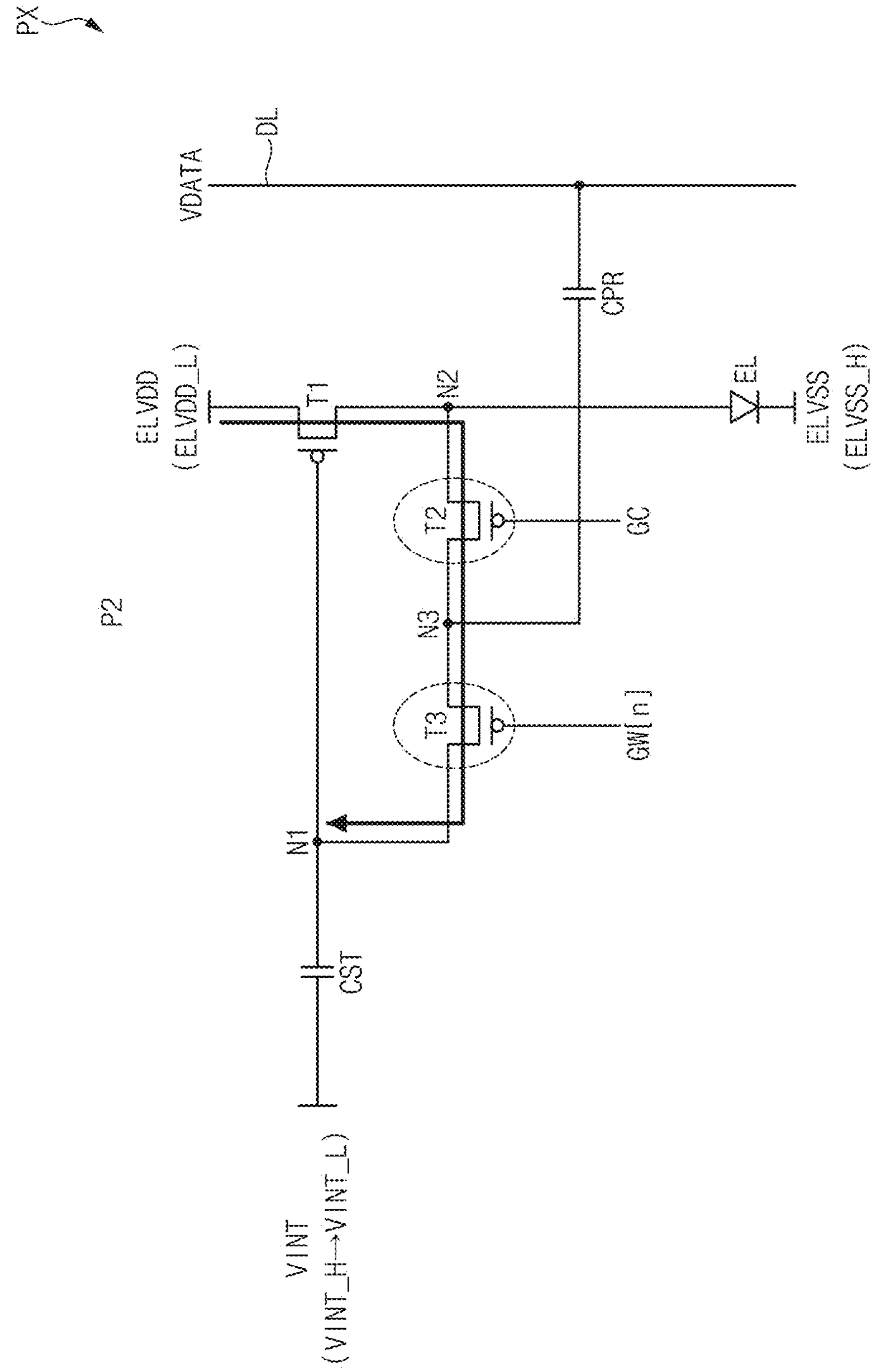
FIG. 5 is a circuit diagram showing an operation of a pixel of FIG. 2 in a second period of FIG. 3.
Figure 6:
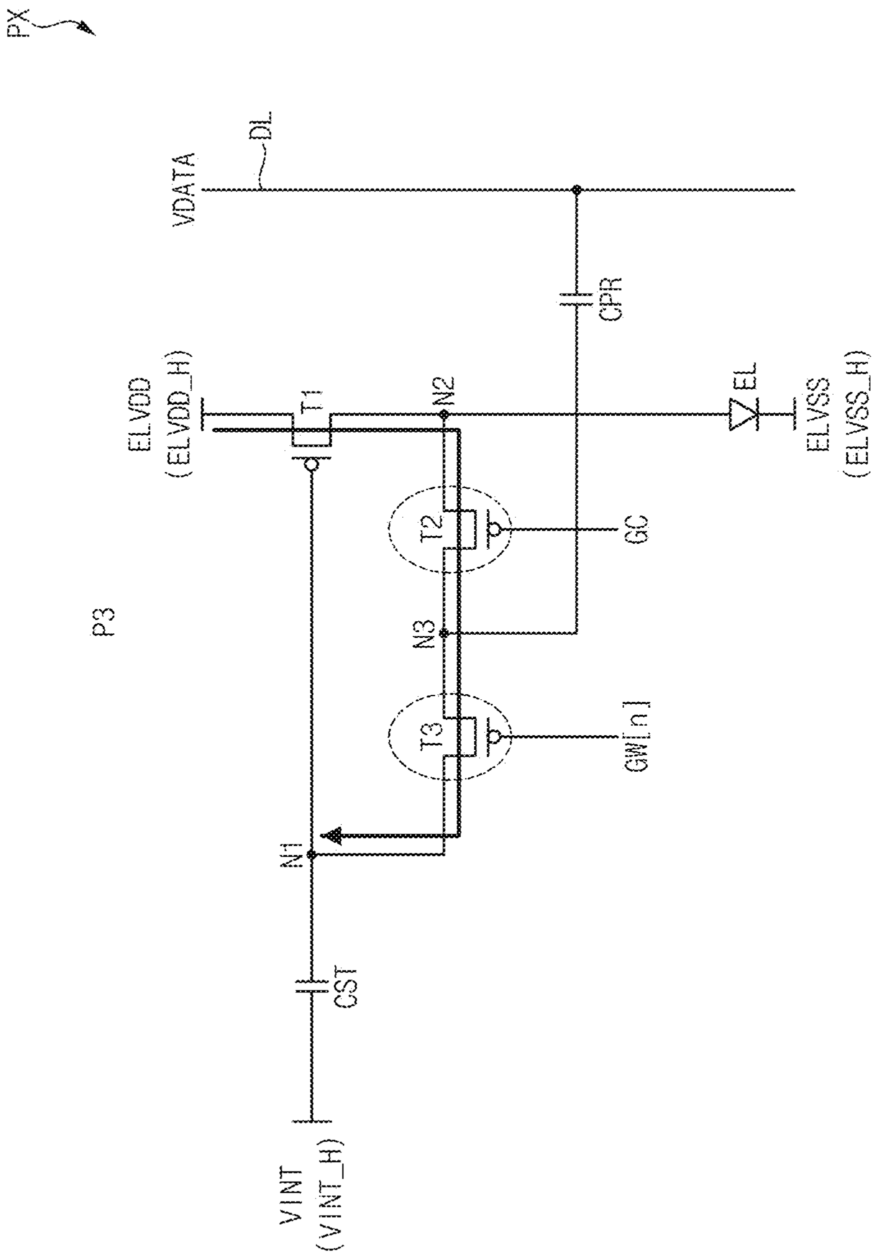
FIG. 6 is a circuit diagram showing an operation of a pixel of FIG. 2 in a third period of FIG. 3.
Figure 7:
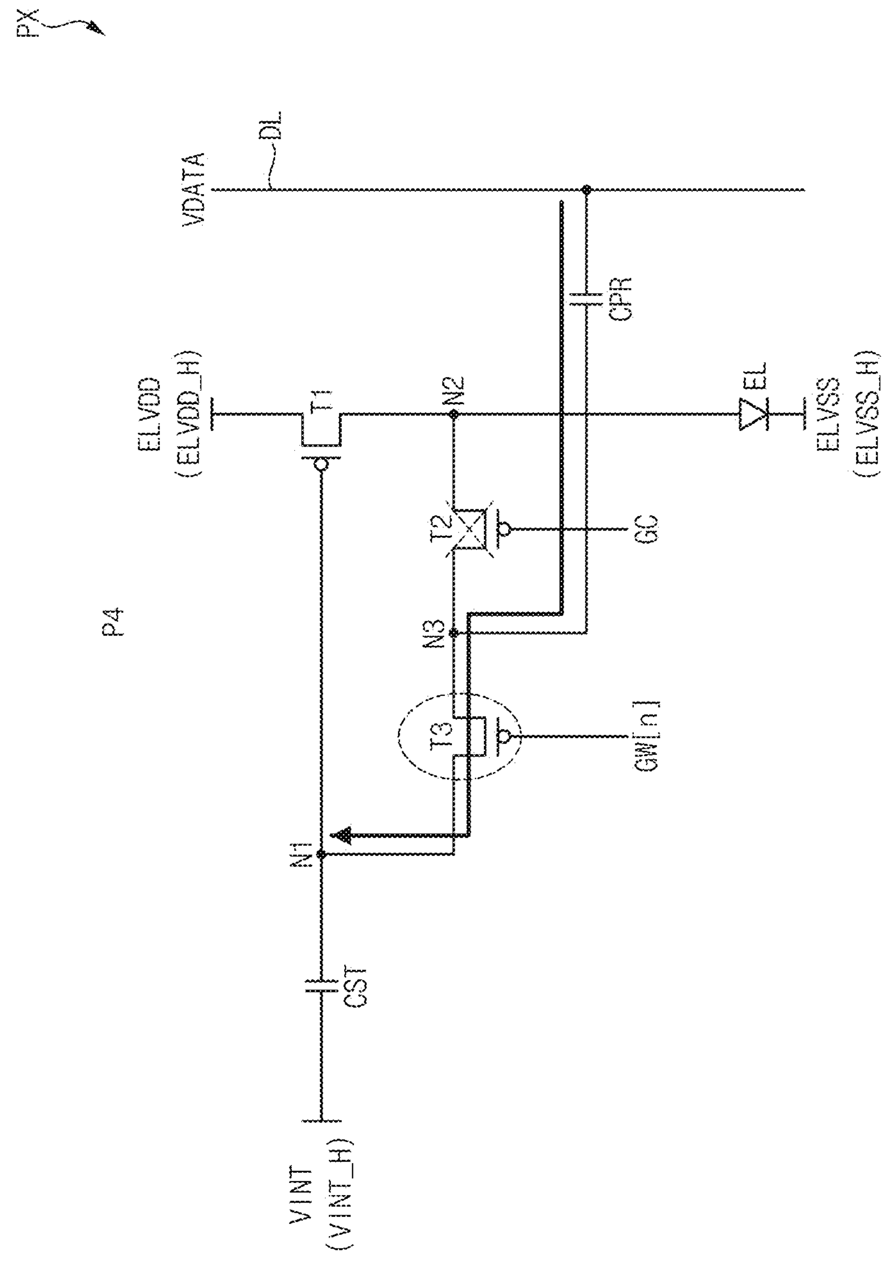
FIG. 7 is a circuit diagram showing an operation of a pixel of FIG. 2 in a fourth period of FIG. 3.
Figure 8:
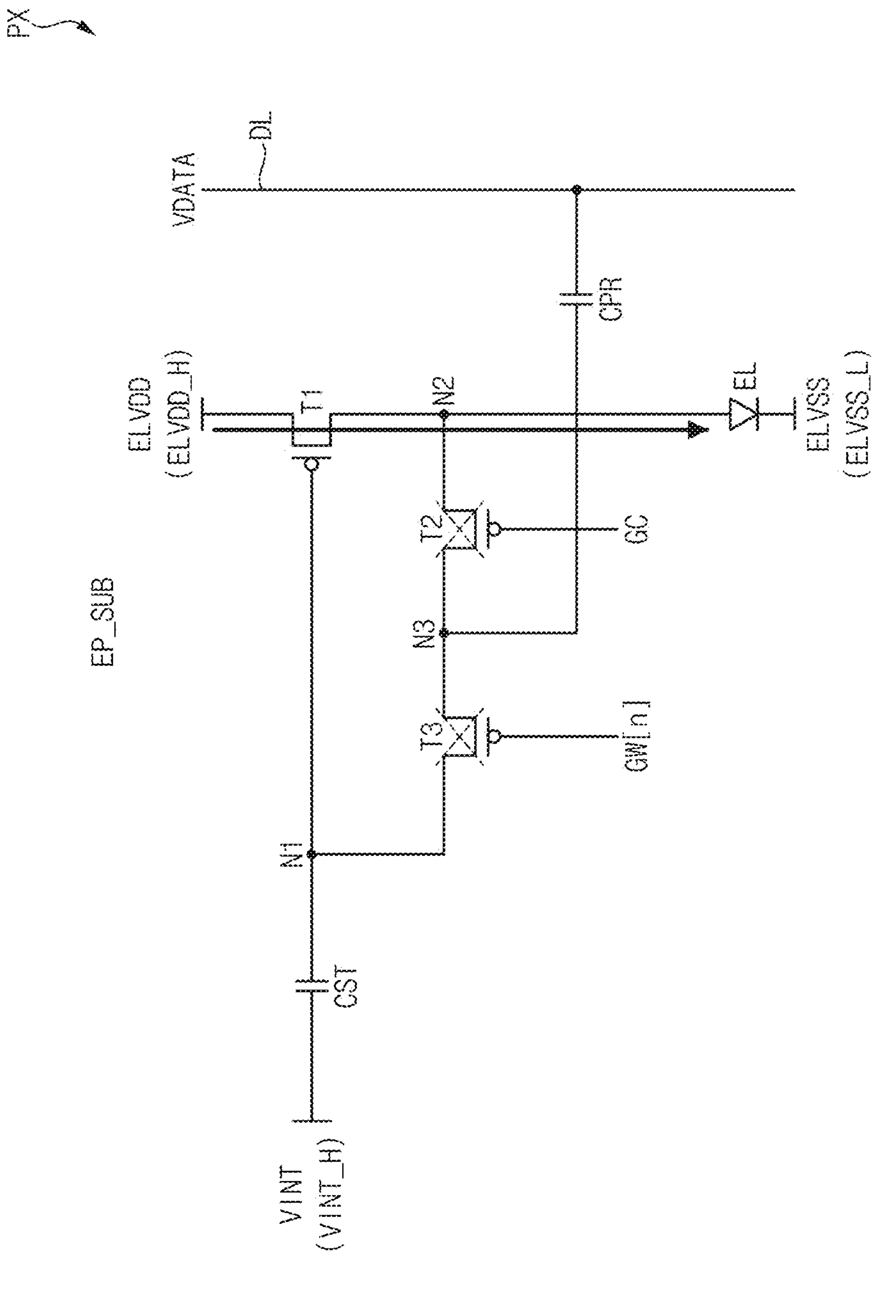
FIG. 8 is a circuit diagram showing an operation of a pixel of FIG. 2 in a sub-emission period of FIG. 3.
Figure 9:
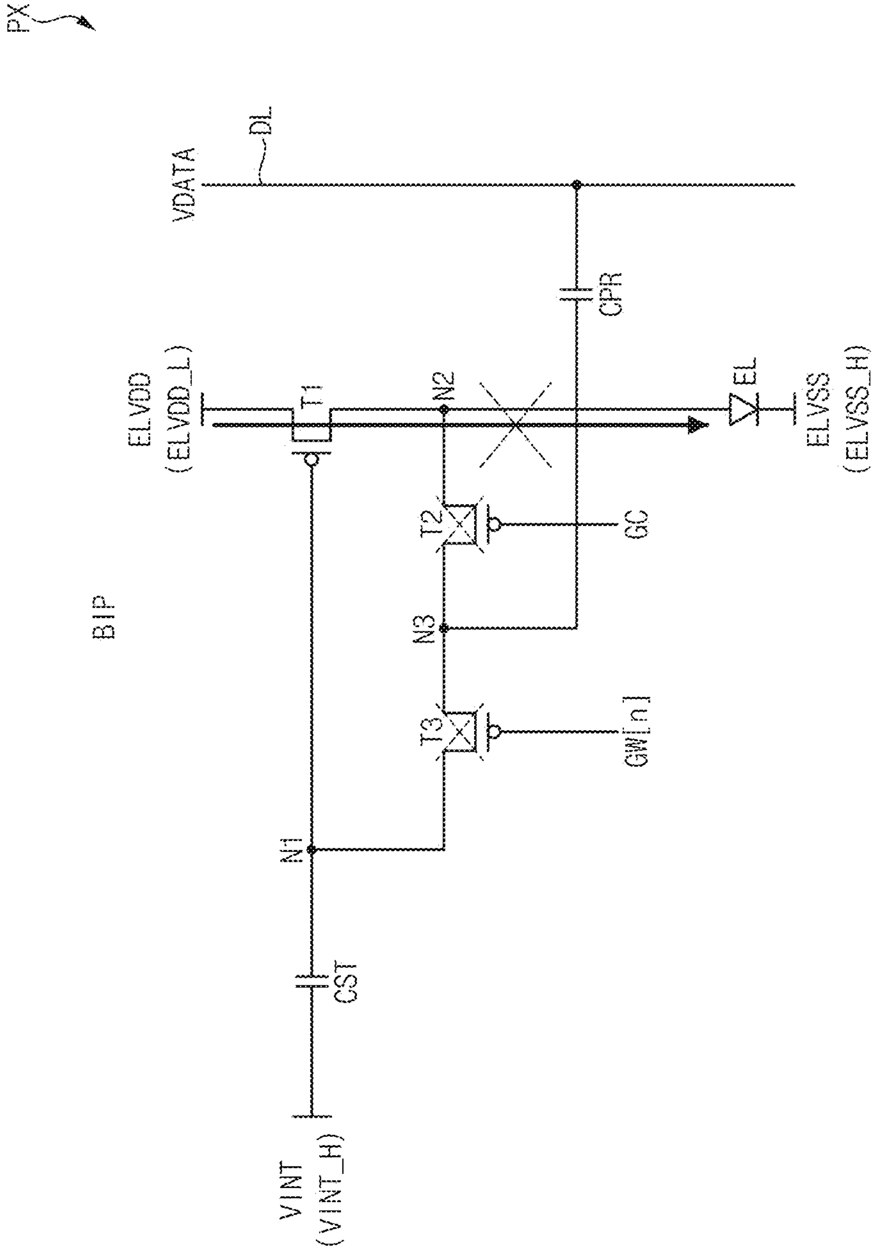
FIG. 9 is a circuit diagram showing an operation of a pixel of FIG. 2 in a black insertion period of FIG. 3.

FIG. 3 is a timing diagram showing a first power supply voltage ELVDD, a second power supply voltage ELVSS, a data write gate signal GW[n], a compensation gate signal GC, an initialization voltage VINT, a data voltage VDATA, and a driving current I_EL of FIG. 2. FIG. 4 is a circuit diagram showing an operation of a pixel PX of FIG. 2 in a first period P1 of FIG. 3. FIG. 5 is a circuit diagram showing an operation of a pixel PX of FIG. 2 in a second period P2 of FIG. 3. FIG. 6 is a circuit diagram showing an operation of a pixel PX of FIG. 2 in a third period P3 of FIG. 3. FIG. 7 is a circuit diagram showing an operation of a pixel PX of FIG. 2 in a fourth period P4 of FIG. 3. FIG. 8 is a circuit diagram showing an operation of a pixel PX of FIG. 2 in a sub-emission period EP_SUB of FIG. 3. FIG. 9 is a circuit diagram showing an operation of a pixel PX of FIG. 2 in a black insertion period BIP of FIG. 3.

Referring to FIG. 3, a frame period FP may include a non-emission period NEP and an emission period EP. The non-emission period NEP may be a period in which a pixel PX does not emit light entirely. The emission period EP may be a period during which the pixel PX undergoes controlled light emission, including alternating sub-emission periods EP_SUB, where the pixel PX emits light, and black insertion periods BIP, where the pixel PX does not emit light. Thus, the EP in certain cases does not imply continuous light emission but a structured alternation between emission and non-emission intervals to reduce motion blue while maintaining luminance.

The non-emission period NEP may include a first period P1, a second period P2, a third period P3, and a fourth period P4. The emission period EP may include sub-emission periods EP_SUB and black insertion periods BIP. Specifically, the emission period EP may include the sub-emission periods EP_SUB and the black insertion periods BIP that alternate with one another.

In the first period P1, the first power supply voltage ELVDD may have a high level ELVDD_H, the second power supply voltage ELVSS may have a high level ELVSS_H, the data write gate signal GW[n] may have a high level, the compensation gate signal GC may have a high level, the initialization voltage VINT may have a low level VINT_L, and the data voltage VDATA may have a reference voltage or a constant voltage. The data voltage VDATA may have the reference voltage or the constant voltage so that it is distinguishable from a state during which it has a voltage representative of image data.

In the second period P2, the first power supply voltage ELVDD may have a low level ELVDD_L, the second power supply voltage ELVSS may have the high level ELVSS_H, the data write gate signal GW[n] may have a low level, the compensation gate signal GC may have a low level, the initialization voltage VINT may have a high level VINT_H and the low level VINT_L, and the data voltage VDATA may have the reference voltage.

In the third period P3, the first power supply voltage ELVDD may have the high level ELVDD_H, the second power supply voltage ELVSS may have the high level ELVSS_H, the data write gate signal GW[n] may have the low level, the compensation gate signal GC may have the low level, the initialization voltage VINT may have the high level VINT_H, and the data voltage VDATA may have the reference voltage.

In the fourth period P4, the first power supply voltage ELVDD may have the low level ELVDD_L, the second power supply voltage ELVSS may have the high level ELVSS_H, the data write gate signal GW[n] may sequentially have first to n-th data write gate signals GW[1] to GW[n] having the low level, the compensation gate signal GC may have the high level, the initialization voltage VINT may have the high level VINT_H, and the data voltage VDATA may sequentially have first to n-th data voltages VDATA[1] to VDATA[n].

In the first to fourth periods P1 to P4 (i.e., the non-emitting period NEP), a driving current I_EL is not generated or is 0. Therefore, the first to fourth periods P1 to P4 (i.e., the non-emission period NEP) may be the period in which the pixel PX does not emit the light entirely.

In the sub-emission periods EP_SUB, the first power supply voltage ELVDD may have the high level ELVDD_H, the second power supply voltage ELVSS may have the low level ELVSS_L, the data write gate signal GW[n] may have the high level, the compensation gate signal GC may have the high level, the initialization voltage VINT may have the high level VINT_H, and the data voltage VDATA may have the reference voltage. The pixel PX may operate with a simultaneous emission driving. That is, for all pixels PX, the first power supply voltage ELVDD may be simultaneously changed to the high level ELVDD_H, and the second power supply voltage ELVSS may be simultaneously changed to the low level ELVSS_L.

In the black insertion periods BIP, the first power supply voltage ELVDD may have the low level ELVDD_L, the second power supply voltage ELVSS may have the high level ELVSS_H, the data write gate signal GW[n] may have the high level, the compensation gate signal GC may have the high level, the initialization voltage VINT may have the high level VINT_H, and the data voltage VDATA may have the reference voltage. The pixel PX may operate with the simultaneous emission driving. That is, for all pixels PX, the first power supply voltage ELVDD may be simultaneously changed to the low level ELVDD_L, and the second power supply voltage ELVSS may be simultaneously changed to the high level ELVSS_H.

In the sub-emission periods EP_SUB, the driving current I_EL may be generated. In the black insertion periods BIP, the driving current I_EL is not generated or is 0. The emission period EP may alternately include the sub-emission periods EP_SUB and the black insertion periods BIP. Therefore, the sub-emission periods EP_SUB and the black insertion periods BIP (i.e., the emission period EP) may be the periods in which the pixel PX emits the light entirely.

Here, the high level ELVDD_H of the first power supply voltage ELVDD may be higher than the low level ELVDD_L of the first power supply voltage ELVDD. The high level ELVSS_H of the second power supply voltage ELVSS may be higher than the low level ELVSS_L of the second power supply voltage ELVSS. In an embodiment, the low level ELVDD_L of the first power supply voltage ELVDD is equal to the high level ELVSS_H of the second power supply voltage ELVSS.

Referring to FIG. 4, in the first period P1, the second transistor T2 may be turned off in response to the compensation gate signal GC having the high level. The third transistor T3 may be turned off in response to the data write gate signal GW[n] having the high level.

The initialization voltage VINT may be changed from the high level VINT_H to the low level VINT_L. Therefore, the voltage of the first node N1 may be changed by a difference between the high level VINT_H and the low level VINT_L, and a hysteresis characteristic of the first transistor T1 may be increased.

Referring to FIG. 5, in the second period P2, the second transistor T2 may be turned on in response to the compensation gate signal GC having the low level. The third transistor T3 may be turned on in response to the data write gate signal GW[n] having the low level.

The first power supply voltage ELVDD may have the low level ELVDD_L, and the low level ELVDD_L of the first power supply voltage ELVDD may be applied to the first node N1 through the first transistor T1, the second transistor T2, and the third transistor T3. Therefore, the voltage of the first node N1 may be initialized.

Referring to FIG. 6, in the third period P3, the second transistor T2 may be turned on in response to the compensation gate signal GC having the low level. The third transistor T3 may be turned on in response to the data write gate signal GW[n] having the low level.

The first power supply voltage ELVDD may have the low level ELVDD_L, and the first transistor T1 may be diode-connected. Therefore, a threshold voltage of the first transistor T1 may be compensated.

Referring to FIG. 7, in the fourth period P4, the second transistor T2 may be turned off in response to the compensation gate signal GC having the high level. The data writing gate signal GW[n] may sequentially have first to n-th data writing gate signals GW[1] to GW[n] having the low level. Therefore, the data writing transistors T3 included in the first to nth pixel rows may be sequentially turned on.

The data voltage VDATA may sequentially have the first to nth data voltages VDATA[1] to VDATA[n]. Therefore, when the data writing transistors T3 included in the first to nth pixel rows are sequentially turned on, the first to n-th data voltages VDATA[1] to VDATA[n] may be sequentially applied to the first node N1.

Referring to FIG. 8, in the sub-emission periods EP_SUB, the second transistor T2 may be turned off in response to the compensation gate signal GC having the high level. The third transistor T3 may be turned off in response to the data write gate signal GW[n] having the high level.

The first power supply voltage ELVDD may have the high level ELVDD_H. The second power supply voltage ELVSS may have the low level ELVSS_L. The high level ELVDD_H of the first power supply voltage ELVDD may be higher than the low level ELVSS_L of the second power supply voltage ELVSS. Therefore, the first transistor T1 may generate the driving current I_EL, and the light emitting element EL may emit light based on the driving current I_EL.

Referring to FIG. 9, in the black insertion periods BIP, the second transistor T2 may be turned off in response to the compensation gate signal GC having the high level. The third transistor T3 may be turned off in response to the data write gate signal GW[n] having the high level.

The first power supply voltage ELVDD may have the low level ELVDD_L. The second power supply voltage ELVSS may have the high level ELVSS_H. The low level ELVDD_L of the first power supply voltage ELVDD may be equal to the high level ELVSS_H of the second power supply voltage ELVSS. Therefore, the first transistor T1 may not generate the driving current I_EL, and the light emitting element EL may not emit light.

Figure 10:
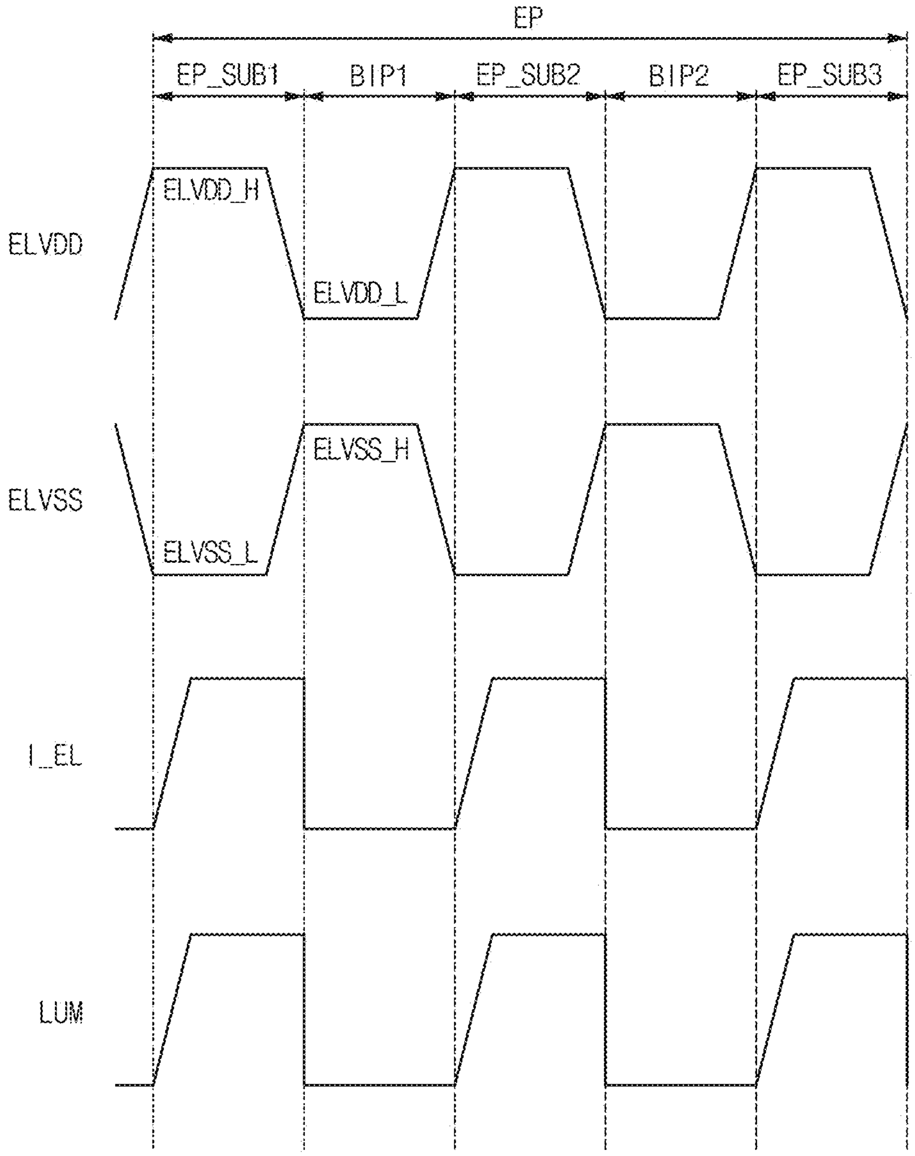
FIG. 10 is a timing diagram explaining sub-emission periods and black insertion periods.

FIG. 10 is a timing diagram explaining sub-emission periods EP_SUB1, EP_SUB2, EP_SUB3 and black insertion periods BIP1, BIP2.

Referring to FIG. 10, an emission period EP may include sub-emission periods EP_SUB1, EP_SUB2, EP_SUB3 that alternate with black insertion periods BIP1, BIP2. For example, in the emission period EP, a first sub-emission period EP_SUB1, a first black insertion period BIP1, a second sub-emission period EP_SUB2, a second black insertion period BIP2, and a third sub-emission period EP_SUB3 may be sequentially arranged. Therefore, in the emission period EP, a pixel PX may repeat an emission and a non-emission. That is, in the emission period EP, a luminance LUM of the pixel PX may repeat generation and non-generation. To prevent the non-generation of the luminance LUM of the pixel PX from being recognized by a user, time lengths of the sub-emission periods EP_SUB1, EP_SUB2, EP_SUB3 and the time lengths of the black insertion periods BIP1, BIP2 may be set short or set shorter than a threshold.

Meanwhile, a motion blur may occur in a display device 10, and the motion blur may cause a dizziness to the user. The motion blur may be reduced as a ratio of a time during which the pixel PX emits the light to the frame period FP becomes smaller. However, when the time during which the pixel PX emits the light is too short, the luminance LUM of the pixel PX may be reduced.

To solve this problem, the emission period EP may include the sub-emission periods EP_SUB1, EP_SUB2, EP_SUB3 that alternate with the black insertion periods BIP1, BIP2. When the time that the pixel PX emits light is the same, and the emission period EP includes the sub emission periods EP_SUB1, EP_SUB2, EP_SUB3 that alternate with the black insertion periods BIP1, BIP2, the user's eyes may rest in a middle of the emission periods EP, and the dizziness may be relatively reduced. That is, the motion blur may be reduced. Therefore, even if the time that the pixel PX emits the light is increased to secure the luminance LUM of the pixel PX, the motion blur may not increase. In an embodiment, a ratio of the sub emission periods EP_SUB1, EP_SUB2, EP_SUB3 to the frame period FP is greater than or equal to 10 percent.

In an embodiment, the driving controller 120 (see FIG. 1) serves as the central control unit responsible for setting and synchronizing the various signals required for operation of the pixel PX, ensuring precise execution of the driving method to reduce motion blur while maintaining luminance.

The driving controller 120 generates the fourth control signal CONT4, which is provided to the power supply voltage generator 160. This control signal dictates the timing and voltage levels of the first power supply voltage ELVDD and the second power supply voltage ELVSS according to the frame period's different phases, as shown in FIG. 3.

During the sub-emission periods EP_SUB, the driving controller 120 may instruct the power supply voltage generator 160 to set the first power supply voltage ELVDD to a high level (ELVDD_H) and the second power supply voltage ELVSS to a low level (ELVSS_L), allowing the pixel PX to emit light. During the black insertion periods BIP, the driving controller 120 may switch ELVDD to a low level (ELVDD_L) and ELVSS to a high level (ELVSS_H), causing the pixel PX to stop emitting light, thereby reducing motion blur.

The driving controller 120 may manage the application of the gate signal Gw[n] and the data voltage Vdata by generating specific control signals for the specific drivers. For example, the first control signal CONT1 is transmitted to the gate driver 130, which produces the data write gate signal Gw[n] at precise times during the frame phases, as depicted in FIG. 2. The second control signal CONT2 is transmitted to the data driver 150, which supplies the appropriate data voltage Vdata to the pixel PX, ensuring that the pixel PX, ensuring that the correct data voltage Vdata is applied. The coordination between Gw[n] and Vdata ensures proper initialization, writing, and holding of the data for each pixel cycle, as further detailed in FIGS. 4 to 7.

The driving controller 120 may also manage the initialization voltage Vint by generating an initialization control signal to ensure proper pixel operation. During the first period P1, the driving controller 120 lowers Vint from its high level to a low level, adjusting the charge stored at the pixel's control node (see FIG. 5). During the second period P2 and the third period P3, Vint is used to initialize and compensate the threshold voltage of the driving transistor T1, as illustrated in FIG. 6.

The driving controller 120 may synchronize and adjust all these signals dynamically throughout the frame period, as depicted in FIG. 3. By controlling ELVDD, ELVSS, Gw[n], Vint, and Vdata, it ensures that the pixel alternates between the sub-emission periods EP_SUB and the blank insertion periods BIP in a manner that enhances visual clarity while maintaining brightness.

In some implementations, the presence of the black insertion periods BIP within the emission period EP may be dynamically adjusted based on the usage mode of the display. For example, when the display is used in an AR or VR mode, the motion blue reduction may be more desirable due to the close proximity of the display to the user's eyes. In such cases, the driving controller 120 can enable BIP within the EP. Alternately, when the display is in a standard mode, where motion blur is less noticeable or high brightness is a priority, the driving controller 120 can configure the EP to consist entirely of the sub-emission periods EP_SUB, effectively eliminating BP.

The mode selection can be determined based on external factors such as the type of content being displayed, the device's operation mode, or user preference. The processor 1010 of FIG. 11 may analyze sensor data, application settings, or user inputs to dynamically adjust the EP configuration in real-time.

Figure 11:
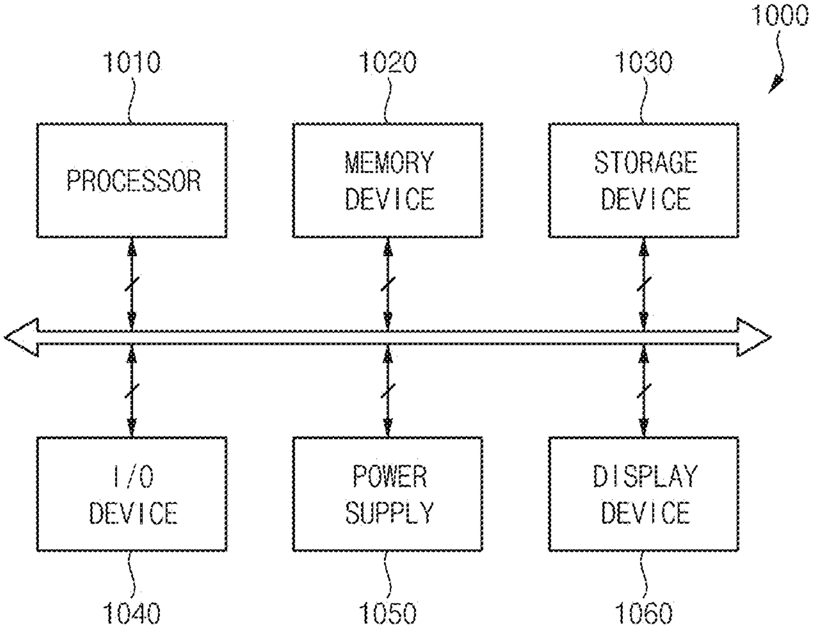
FIG. 11 is a block diagram showing an electronic device.
Figure 12:
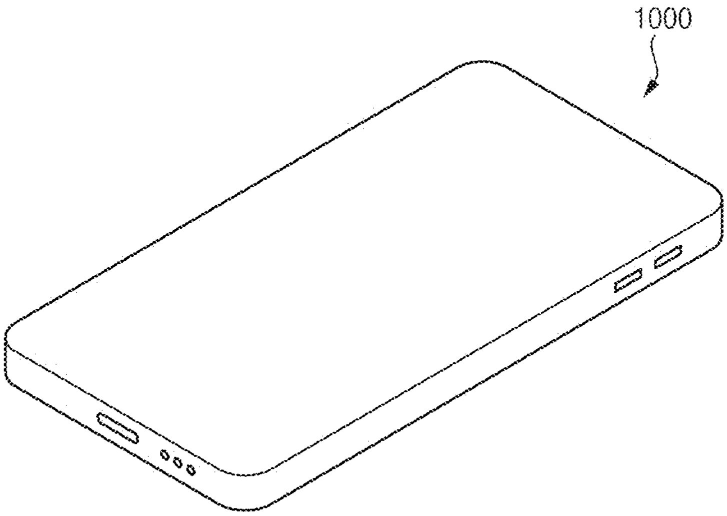
FIG. 12 is a diagram showing an embodiment in which an electronic device of FIG. 11 is implemented as a smart phone.

FIG. 11 is a block diagram showing an electronic device 1000. FIG. 12 is a diagram showing an embodiment in which an electronic device 1000 of FIG. 11 is implemented as a smart phone.

Referring to FIGS. 11 and 12, the electronic device 1000 may include a processor 1010, a memory device 1020, a storage device 1030, an input/output I/O device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus USB device, other electronic device, and the like.

In an embodiment, as illustrated in FIG. 12, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display HMD device, and the like.

The processor 1010 may perform various computing functions. The processor 1010 may be a micro processor, a central processing unit CPU, an application processor AP, and the like. The processor 1010 may be coupled to other components via an address bus, a control bus, a data bus, and the like. Further, the processor 1010 may be coupled to an extended bus such as a peripheral component interconnection PCI bus.

The memory device 1020 may store data for operations of the electronic device 1000. For example, the memory device 1020 may include at least one nonvolatile memory device such as an erasable programmable read-only memory EPROM device, an electrically erasable programmable read-only memory EEPROM device, a flash memory device, a phase change random access memory PRAM device, a resistance random access memory RRAM device, a nano floating gate memory NFGM device, a polymer random access memory PoRAM device, a magnetic random access memory MRAM device, a ferroelectric random access memory FRAM device, and the like and/or at least one volatile memory device such as a dynamic random access memory DRAM device, a static random access memory SRAM device, a mobile DRAM device, and the like.

The storage device 1030 may include a solid state drive SSD device, a hard disk drive HDD device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

Figure 13:
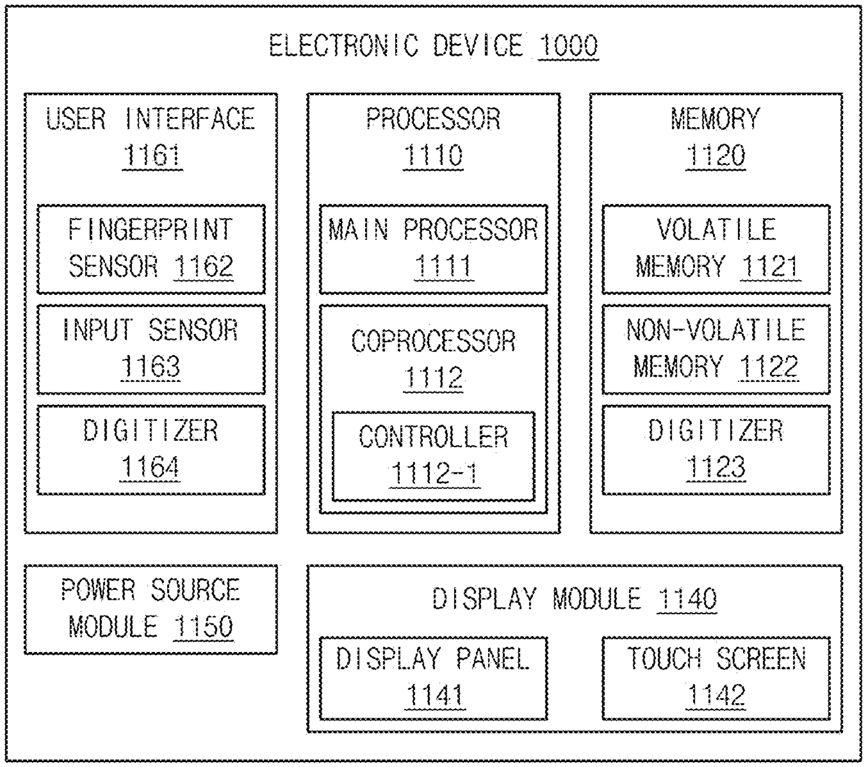
FIG. 13 is a block diagram showing an electronic device according to an alternate embodiment.

FIG. 13 is a diagram illustrating an electronic device according to an embodiment of the present invention. Referring to FIG. 13, the electronic device 1000 according to one embodiment of the present invention may output various information (e.g., images, text, music, etc.) through a display module 1140, which, for example, may correspond to the display device shown in FIG. 1. When a processor 1110 executes an application stored in a memory 1120, the display module 1140 may provide application information to a user through a display panel 1141.

In some embodiments, the electronic device 1000 may be configured as a smartphone, camera, smart TV, monitor, smartwatch, tablet, automotive display, or AR/VR headset. For example, the electronic device 1000 may be a smartphone including a touch-sensitive display area DA for interaction and a non-display area NDA including sensors and circuits for enhanced functionality. For example, the electronic device 1000 may be a television or monitor including a large display area DA for high-resolution video playback and a non-display area NDA incorporating driving circuits or connectivity modules for external inputs. For example, the electronic device 1000 may be a smartwatch including a display area DA optimized for compact and high-clarity visuals and a non-display area NDA integrating biometric sensors for health monitoring. In some cases, the electronic device 1000 be an AR/VR headset.

In some embodiments, memory 1120 may store information such as software codes for operating an application program 1123. The application program 1123 may include a software designed to execute specific tasks or provide functionality to a user. The application program 1123 may operate under the control of the processor 1110 and utilizes data stored in the memory 1120 to deliver a wide range of features, such as productivity tools, multimedia streaming and playback, file or mail deliveries or communication services. The application program 1123 interacts seamlessly with the user interface 1161 or touch screen 1142, allowing a user to launch, navigate, and utilize the program through user inputs such as touch, tap, gesture, or voice interaction.

Upon user selection of an application via touch screen 1142 or user interface 1161, the processor 1110 may execute the application program 1123 corresponding to the selected application retrieved from the memory 1120 to perform functionalities of the application. For example, when a user selects a camera application by tapping the icon (or a camera application icon) presented on the display panel 1141, the processor 1110 activates a camera module. The processor 1110 may transmit image data corresponding to a captured image acquired through the camera module to the display module 1140. The display module 1140 may display an image corresponding to the captured image through the display panel 1141.

As another example, when a user wishes to make a phone call, the user taps the telephone icon displayed on the display module 1140, the processor 1110 may execute a phone application program stored in the memory 1120. A telephone keypad may be presented on the display panel 1141 for the user to enter a phone number to call.

As another example, the display module 1140 may be integrated into an electronic device 1000, such as a laptop computer, smart TV, or tablet. A user wishing to access a multimedia streaming application (e.g., to watch a music video or movie) can do so by tapping the corresponding icon. This action activates the application, allowing the user to view the streamed content.

The processor 1110 may include a main processor 1111 and an auxiliary or coprocessor 1112. The main processor 1111 may include a central processing unit (CPU). The main processor 1111 may further include one or more of a graphics processing unit (GPU), a communication processor (CP), and an image signal processor (ISP).

The coprocessor 1112 may include a controller 1112-1. The controller 1112-1 may include an interface conversion circuit and a timing control circuit. The controller 1112-1 may receive an image signal from the main processor 1111, convert the data format of the image signal to match the interface specifications with the display module 1140, and output image data. The controller 1112-1 may output various control signals to drive the display module 1140. For example, the controller 1112-1 may drive the display module 1140 to display the icon on the display screen suitable for selection by a user to cause execution of an application program 1123.

The memory 1120 may store one or more application programs 1123 and various data used by at least one component (for example, the processor 1110 or the user interface 1161) of the electronic device 1000 and input data or output data for commands related thereto. For example, a camera application program, a GPS application program, an augmented reality and virtual reality application program, and other application programs that can be executed by the processor 1110 upon selection of corresponding icons presented on the display screen (or display panel 1141) via the touch screen 1142 or user interface 1161 by the user. In addition, various setting data corresponding to user settings may be stored in the memory 1120. The memory 1120 may include volatile memory 1121 and non-volatile memory 1122.

The display module 1140 may output visual information (images) to the user. The display module 1140 may include the display panel 1141, a gate driver, the source driver, a voltage generation circuit, and a touch screen 1142. The display module 1140 may further include a window, a chassis, and a bracket to protect the display panel 1141. The display module 1140 may include at least a part of the configuration of the display device shown in FIG. 1.

The user interface 1161 serves as the interaction medium between a user and the electronic device 1000. The user interface 1161 may detect an input by a part (e.g., finger) of a user's body or an input by a pen or a mouse, and generate an electric signal or data value corresponding to the input. The user interface 1161 includes the fingerprint sensor 1162, the input sensor 1163, and a digitizer 1164.

The fingerprint sensor 1162 may sense a fingerprint for biometric recognition of the user and may also measure one or more biological signals such as blood pressure, moisture, or body mass.

The input sensor 1163 may sense user interactions including touch, tap, gesture, motion, spoken command, and eye movement. The input sensor 1163 includes optical sensors for image capture, eye tracking, or motion and gesture detection. Optical sensors may be infrared or semiconductor photodetectors. The input sensor 1163 includes audio and acoustic sensors, which may be MEMS microphones for voice recognition or sound-based interaction. The audio and acoustic sensors can be installed as part of the user interface 1161 or embedded in the display panel 1141.

The digitizer 1164 may generate a data value corresponding to coordinate information of input by a pen or a mouse to control movement of an onscreen cursor. The digitizer 1164 may generate the amount of change in electromagnetic due to the input as the data value. The digitizer may detect an input by a passive pen or transmit and receive data with an active pen or a remote.

At least one of the fingerprint sensor 1162, the input sensor 1163, or the digitizer 1164 may be implemented as a sensor layer formed on the top layer of the display panel 1141 through a continuous process with a process of forming elements (for example, the light emitting element, the transistor, and the like) included in the display panel 1141.

In addition, the user interface 1161 may further include, for example, a gesture sensor, a gyro sensor that senses rotational movements, an acceleration sensor to track translational movement, a grip sensor, a pressure sensor, a proximity sensor, a color sensor, an infrared (IR) emitter and camera sensor for tracking gaze direction and eye movements, a temperature sensor, or a light sensor. For example, the gyro sensor, acceleration sensor, and infrared emitter and camera may be particularly suitable for AR/VR headset functions.

The touch screen 1142 includes touch sensors embedded in semiconductor layers of the display panel 1141 to sense pressure applied to the top layer (screen) of the display panel 1141. The touch sensors can be a capacitive or a resistive type. The touch screen 1142 may serve as the primary interface for the user to select and navigate applications, control, and interact with the electronic device 1000.

The display panel 1141 (or display) may include a liquid crystal display panel, an organic light emitting display panel, or an inorganic light emitting display panel, and the type of the display panel 1141 is not particularly limited. The display panel 1141 may be of a rigid type or a flexible type that can be rolled or folded. The display module 1140 may further include a supporter, bracket, heat dissipation member, and the like that support the display panel 1141. The display panel 1141 may include the display unit shown in FIG. 1.

The power source module 1150 may supply power to the components of the electronic device 1000. The power source module 1150 may include a battery that charges the power source voltage. The battery may include a non-rechargeable primary battery or a rechargeable secondary battery or fuel cell. The power source module 1150 may include a power management integrated circuit (PMIC). The PMIC may supply optimized power source to each of the components described above including the display module 1140.

The inventive concepts may be applied to any display device and any electronic device including the touch panel. For example, the inventive concepts may be applied to a mobile phone, a smart phone, a tablet computer, a digital television TV, a 3D TV, a personal computer PC, a home appliance, a laptop computer, a personal digital assistant PDA, a portable multimedia player PMP, a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the teachings of the inventive concept. Accordingly, all such modifications are intended to be included within the scope of the inventive concept.

What is claimed is:

1. A display driving circuit for driving a display device including a pixel receiving a first power supply voltage and a second power supply voltage, comprising:
 the pixel comprising:
  a driving transistor configured to generate a driving current;
  a data writing transistor configured to provide a data voltage to the driving transistor; and
  a light emitting element configured to emit light based on the driving current; and
 a display controller controlling the first power supply voltage and the second power supply voltage during an emission period of a frame period for the pixel so that the frame period includes sub-emission periods in which the pixel emits light and black insertion periods in which the pixel does not emit the light that alternate with one another,
 wherein the display controller controls the first power supply voltage to have a high level and the second power supply voltage to have a low level, in the sub-emission periods,
 wherein the display controller controls the first power supply voltage to have a low level and the second power supply voltage to have a high level, in the black insertion periods,
 wherein a high level of the first power supply voltage is higher than the low level of the first power supply voltage, and the high level of the second power supply voltage is higher than a low level of the second power supply voltage,
 wherein the low level of the first power supply voltage is equal to the high level of the second power supply voltage, and
 wherein the pixel comprises:
 the driving transistor including a gate electrode connected to a first node, a first electrode receiving the first power supply voltage, and a second electrode connected to a second node;
 a compensation transistor including a gate electrode receiving a compensation gate signal, a first electrode connected to the second node, and a second electrode connected to a third node;
 the data writing transistor including a gate electrode receiving a data write gate signal, a first electrode connected to the third node, and a second electrode connected to the first node;
 a storage capacitor including a first electrode receiving an initialization voltage and a second electrode connected to the first node;
 a parasitic capacitor including a first electrode connected to a data line transmitting the data voltage and a second electrode connected to the third node; and
 the light emitting element including an anode connected to the second node and a cathode receiving the second power supply voltage.

2. The display driving circuit of claim 1, wherein the driving current is generated in the sub-emission periods and not generated in the black insertion periods.

3. The display driving circuit of claim 1, wherein the display controller controls the first power supply voltage and the second power supply voltage such that the pixel and at least one other pixel operate with simultaneous emission driving.

4. The display driving circuit of claim 1, wherein a ratio of the sub-emission period to the frame period is greater than or equal to 10 percent.

5. The display driving circuit of claim 1, wherein the driving transistor, the compensation transistor, and the data writing transistor are P-channel metal-oxide-semiconductor (PMOS) transistors.

6. A display device, comprising:
 a display panel including a pixel;
 a gate driver configured to provide a gate signal to the pixel;
 a data driver configured to provide a data voltage to the pixel; and
 a power supply voltage generator configured to provide a first power supply voltage and a second power supply voltage,
 wherein an emission period of a frame period for the pixel includes sub-emission periods in which the pixel emits light that alternate with black insertion periods in which the pixel does not emit the light,
 wherein, in the sub-emission periods, the power supply voltage generator sets the first power supply voltage to a high level and sets the second power supply voltage to a low level,
 wherein, in the black insertion periods, the power supply voltage generator sets the first power supply voltage to a low level and sets the second power supply voltage to a high level,
 wherein a high level of the first power supply voltage is higher than the low level of the first power supply voltage, and the high level of the second power supply voltage is higher than a low level of the second power supply voltage,
 wherein the low level of the first power supply voltage is equal to the high level of the second power supply voltage, and
 wherein the pixel comprises:
 a first transistor including a gate electrode connected to a first node, a first electrode receiving the first power supply voltage, and a second electrode connected to a second node;
 a second transistor including a gate electrode receiving a compensation gate signal, a first electrode connected to the second node, and a second electrode connected to a third node;
 a third transistor including a gate electrode receiving a data write gate signal, a first electrode connected to the third node, and a second electrode connected to the first node;
 a storage capacitor including a first electrode receiving an initialization voltage and a second electrode connected to the first node;
 a parasitic capacitor including a first electrode connected to a data line transmitting the data voltage and a second electrode connected to the third node; and a light emitting element including an anode connected to the second node and a cathode receiving the second power supply voltage.

7. The display device of claim 6, wherein a driving current of the pixel is generated in the sub-emission periods and not generated in the black insertion periods.

8. The display device of claim 6, wherein the pixel operates with a simultaneous emission driving.

9. The display device of claim 6, wherein a ratio of the sub-emission period to the frame period is 10 percent or more.

10. An electronic device, comprising the display device of claim 6.

* * * * *